(12) United States Patent
Wasily (10) Patent No.: US 8,306,343 B2
(45) Date of Patent: Nov. 6, 2012

(54) OPTIMIZED PREDICTION BASED IMAGE COMPRESSION

(75) Inventor: Nabil Yousef Wasily, Foothill Ranch, CA (US)

(73) Assignee: Newport Media, Inc., Lake Forest, CA (US)

( * ) Notice: Subject to any disclaimer, the term of this patent is extended or adjusted under 35 U.S.C. 154(b) by 385 days.

(21) Appl. No.: 12/757,474

(22) Filed: Apr. 9, 2010

(65) Prior Publication Data

US 2011/0249908 A1    Oct. 13, 2011

(51) Int. Cl.
G06K 9/36 (2006.01)
(52) U.S. Cl. .................. 382/238; 382/233; 382/236
(58) Field of Classification Search .................. 382/232, 382/233, 240, 236, 238, 248; 348/409.1, 348/411.1; 375/240.12, E7.211, E7.142, 375/E7.133, E7.246
See application file for complete search history.

(56) References Cited

U.S. PATENT DOCUMENTS

| | | | |
|---|---|---|---|
| 5,754,702 A * | 5/1998 | Simpson | 382/240 |
| 6,157,676 A * | 12/2000 | Takaoka et al. | 375/240.13 |
| 7,444,029 B2 * | 10/2008 | Shen et al. | 382/238 |
| 7,450,640 B2 * | 11/2008 | Kim et al. | 375/240.12 |
| 7,778,331 B2 * | 8/2010 | Sato et al. | 375/240.26 |
| 7,995,654 B2 * | 8/2011 | Boon et al. | 375/240.12 |
| 8,135,064 B2 * | 3/2012 | Tasaka et al. | 375/240.16 |
| 8,145,002 B2 * | 3/2012 | Sekiguchi et al. | 382/238 |
| 8,149,910 B2 * | 4/2012 | Tanizawa et al. | 375/240.12 |

\* cited by examiner

*Primary Examiner* — Anh Hong Do
(74) *Attorney, Agent, or Firm* — Rahman LLC (57) ABSTRACT

A technique for optimizing a prediction method of samples in blocks of an image is provided. The image includes a first block, a second block, a third block, and a fourth block, each of the blocks include 8×8 blocks and form one Macro block. The method includes performing a prediction of the second block, the third block and the fourth block by performing at least one of prediction methods. A prediction error per block ($P_e$) is computed for each prediction method that is performed to predict the second block, the third block, and the fourth block. The prediction error per block ($P_e$) equals an original block value minus a predicted block value. An optimal prediction method is chosen from each of the prediction methods performed that results in minimum $\Sigma|P_e|$ pixels per block (summation on pixels per block). The optimal prediction method and the $P_e$ for each block are stored.

20 Claims, 8 Drawing Sheets

OPTIMIZED PREDICTION BASED IMAGE COMPRESSION

BACKGROUND

1. Technical Field

The embodiments herein generally relate to image compression, and, more particularly, to an optimized prediction based engine for image compression.

2. Description of the Related Art

Image compression is the application of data compression on digital images to reduce redundancy of image data in order to be able to store or transmit data in an efficient form. Image compression can be either lossy or lossless. In lossless image compression, all data from an original file is preserved. Lossy compression involves removing some data from the original file and saving the image with a reduced file size. JPEG (Joint Photographic Experts Group) is a commonly used standard for lossy compression of photographic images.

The degree of compression can be adjusted, allowing a selectable tradeoff between storage size and image quality. The image is composed of two components. The first component Y represents the brightness or the black and white component. I and Q represent the second component, which is the chrominance or color component. The image is divided into blocks that are 8×8 pixels in size. The pixel is the smallest image component or image unit. In the JPEG compression technique, each image undergoes the steps of Discrete Cosine Transform (DCT), Quantization, Zigzag scan, Differential Pulse Code Modulation (DPCM), Run Length Coding (RLC), and Entropy Coding.

Figure 1:
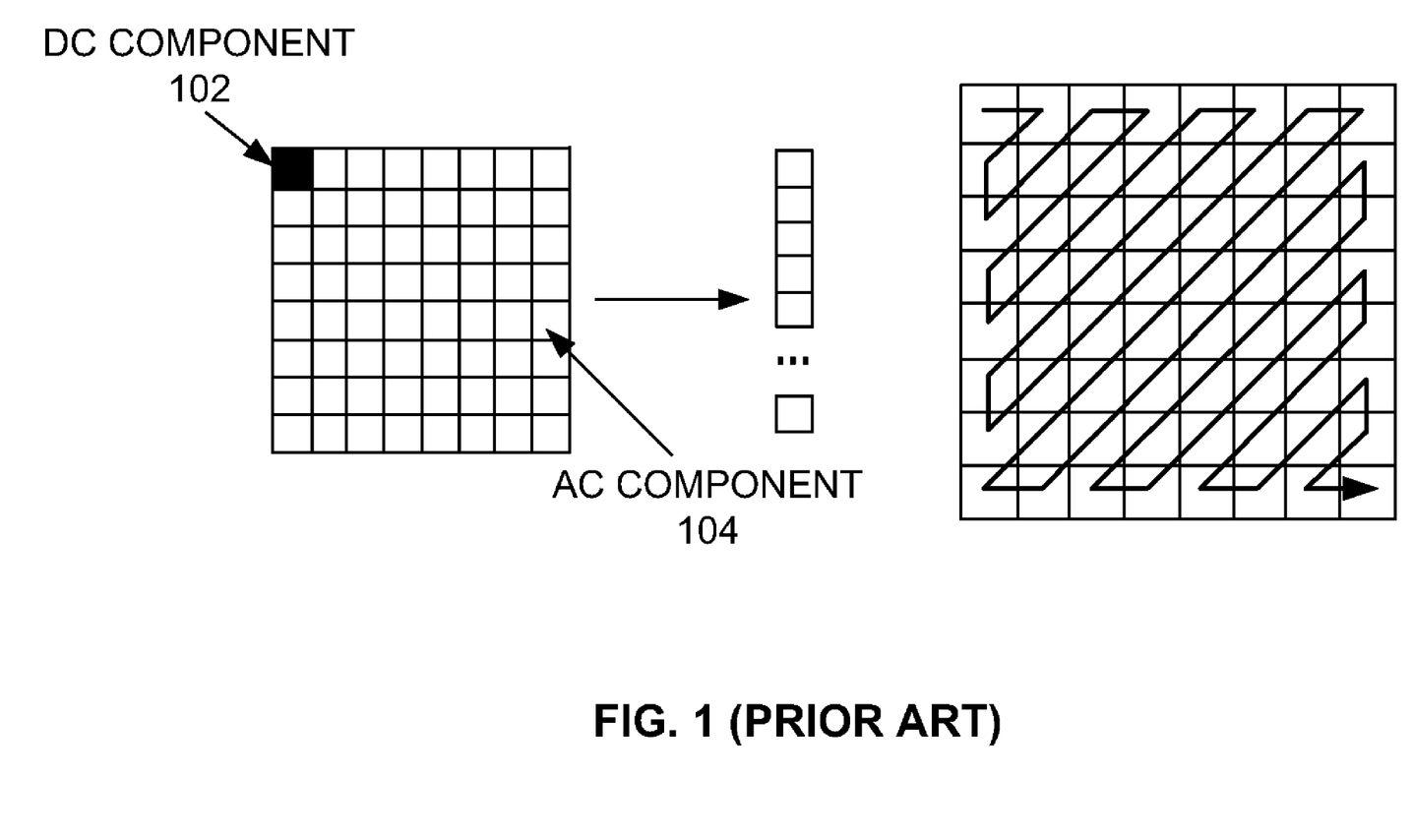
FIG. 1 illustrates a Zigzag scan on an 8×8 block that maps the block to a 1×64 vector composed of a DC component and 63 AC components.

FIG. 1 illustrates a Zigzag scan on an 8×8 block that maps the block to a 1×64 vector composed of a DC component 102 and 63 AC components 104. The DC component 102 has a zero frequency whereas the AC component 104 has nonzero frequencies. The value in the location F[0,0] of the transformed matrix is called the DC coefficient and is the average of all 64 values in the matrix. The other 63 values are called AC coefficients and have a frequency coefficient associated with them. Spatial frequency coefficients increase as one moves from left to right (horizontally) or from top to bottom (vertically). Low spatial frequencies are clustered in the left top corner.

Figure 2:
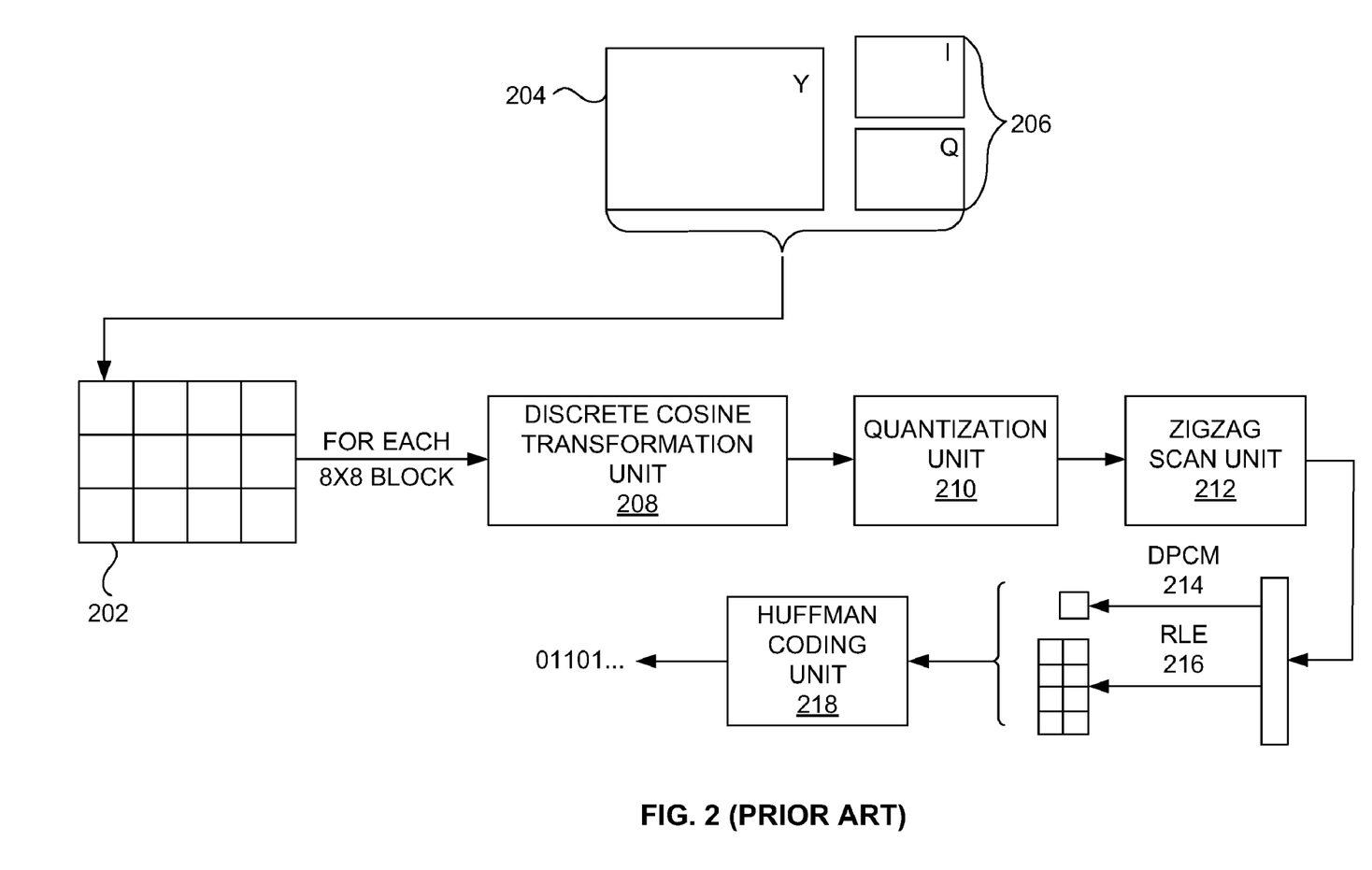
FIG. 2 illustrates a block diagram of operations of a JPEG compression technique applied on an image divided into blocks of 8×8 pixels in size having a black and white component and a chrominance component.

FIG. 2 illustrates a block diagram of operations of a JPEG compression technique applied on an image 202 divided into blocks of 8×8 pixels in size having a black and white component 204 and a chrominance component 206; the JPEG compression technique including a Discrete Cosine Transform (DCT) operation 208, a Quantization operation 210, a Zigzag scan operation 212, a Differential Pulse Code Modulation (DPCM) operation 214, a Run Length Coding (RLE) operation 216, and a Huffman coding operation 218. The DCT operation 208 transforms the image 202 from a spatial domain to a frequency domain by transforming it into DCT coefficients in the frequency domain.

The Quantization operation 210 removes perceptually less significant data to reduce the number of bits per DCT coefficient. The Quantization operation 210 is based on the observation that psychophysical experiments suggest that humans are much less likely to notice the loss of very high spatial frequency components compared to the loss of lower frequency components. The DCT coefficients are divided by a constant N and rounded off to the nearest integer. In JPEG, each DCT F[u,v] is divided by a constant q(u,v). The table of q(u,v) is called quantization table. Q(u, v) tends to have larger values towards the lower right corner. This aims to introduce more loss at the higher spatial frequencies, which are less likely to be detected by humans.

The Zigzag scan operation 212 maps the block to a 1×64 vector composed of a DC component 102 and an AC component 104. The Zigzag pattern groups low frequency coefficients in the top of the vector. In the DPCM operation 214, the DC component 102 is encoded by DPCM using the difference from previous 8×8 blocks. Since the DC component 102 is large and varied but often close to previous values, the DC component 102 is not sent. Instead, only the difference from the previous one is sent. This is known as a DC intra frame technique or an inter block prediction technique. In the RLE operation 216, the AC component 104 is encoded by a simple compression RLC. There are 63 values of the AC coefficients, among which are long strings of zeros due to the Zigzag scan.

Each AC coefficient encoded as a pair of values includes a skip and a value. The skip indicates the number of zeros in the run and the value is the next non-zero coefficient. In the Huffman coding operation 218, the DC component 102 and the AC component 104 are represented by a smaller number of bits such as code words. A prefix property of the Huffman code words enables decoding of the encoded bit stream unambiguously. The JPEG standards uses a prediction technique based on intra frame or inter blocks. In order to decode the DC component of a new 8×8 block, a previously decoded 8×8 block DC component is used. Limiting prediction to DC components only, leads to low compression efficiency. Thus, there is a need for an improved technique for prediction based image compression with improved compression efficiency.

SUMMARY

In view of the foregoing, an embodiment herein provides a method of optimizing a prediction method of samples in blocks of an image. The image includes a first block, a second block, a third block, and a fourth block. The first block, the second block, the third block, and the fourth block include 8×8 blocks. Each of the 8×8 blocks form on Macro block. The method includes performing a prediction of the second block from the first block by performing any of a DC prediction method and a horizontal prediction method, performing a prediction of the third block from the first block and the second block by performing the DC prediction method, and at least one of a vertical prediction method and a vertical left prediction method, performing a prediction of the fourth block from the first block, the second block, and the third block by performing any of the DC prediction method and the horizontal prediction method, or any of the vertical prediction method and a vertical right prediction method.

A prediction error per block ($P_e$) is computed for each prediction method that is performed to predict the second block, the third block, and the fourth block. The prediction error per block ($P_e$) equals an original block value minus a predicted block value. An optimal prediction method is chosen from each of the prediction methods performed. The performed prediction methods include the DC prediction method, the horizontal prediction method, and at least one of the vertical prediction method, the vertical left prediction method, and a vertical right prediction method.

The method of choosing the optimal prediction method includes computing a summation of the prediction error per block for each of the DC prediction, the horizontal prediction method, the vertical prediction method, the vertical left prediction method, and the vertical right prediction method. The summation equals $\Sigma |P_e|$ (summation on pixels per block), and choosing the optimal prediction method from the DC prediction method, the horizontal prediction method, the vertical prediction method, the vertical left prediction method, and the vertical right prediction method based on the summation that results in a minimum $\Sigma|P_e|$ pixels per block (summation on pixels per block).

The method of choosing the optimal prediction method may include passing the $P_e$ for each of the DC prediction method, the horizontal prediction method, the vertical prediction method, the vertical left prediction method, and the vertical right prediction method through a Discrete Cosine Transformation, a Zigzag scan, and a Huffman Coding, and choosing the optimal prediction method from the DC prediction method, the horizontal prediction method, the vertical prediction method, the vertical left prediction method, and the vertical right prediction method that results in a minimum number of output bits.

The optimal prediction method that results in a minimum number of output bits and the $P_e$ for each of the first block, the second block and the fourth block is stored. The $P_e$ stored is a JPEG encoded $P_e$. A prediction of a fifth block may be performed based on a first diagonal block, a second diagonal block, a third diagonal block, a first vertical block, and a horizontal block. The prediction method is a luminance intra-block prediction method.

In another aspect, a method of optimizing a prediction method of samples in blocks of an image is provided. The image includes a first block, a second block, and a third block. The first block, the second block, and the third block include 16×16 blocks. Each of the 16×16 blocks form one Luma Macro block. Each of the Luma macro block corresponds to an 8×8 color block. The method includes performing a prediction of the second block from the first block by performing any of a DC prediction method and a horizontal prediction method, performing a prediction of the third block from the first block, the second block. The third block is predicted by performing any of a DC prediction method, and any of a vertical prediction method and a vertical left prediction method.

The method further includes performing a prediction of a fourth block from the first block, the second block, and the third block by performing any of the DC prediction method and, the horizontal prediction method, or any of the vertical prediction method and a vertical right prediction method. A prediction error per block ($P_e$) is computed for each prediction method that is performed to predict the second block, the third block, the fourth block. The prediction error per block ($P_e$) equals an original block value minus a predicted block value. An optimal prediction method is chosen from the DC prediction method, the horizontal prediction method, the vertical prediction method, the vertical left prediction method, and the vertical right prediction method.

The method of choosing the optimal prediction method includes computing a summation of the prediction error for all pixels per block for each of the DC prediction method, the horizontal predication method, the vertical prediction method, the vertical left prediction method, and the vertical right prediction method, and choosing the optimal prediction method from each of the prediction methods performed. The performed prediction methods include the DC prediction method, the horizontal prediction method, and at least one of the vertical prediction method, the vertical left prediction method, and a vertical right prediction method. The summation equals $\Sigma|P_e|$.

The method of choosing the optimal prediction method may also include passing the $P_e$ for each of the DC prediction method, the horizontal prediction method, the vertical prediction method, the vertical left prediction method, and the vertical right prediction method through a Discrete Cosine Transformation, a Zigzag scan, and a Huffman Coding, and choosing the optimal prediction method from the DC prediction method, the horizontal prediction method, the vertical prediction method, the vertical left prediction method, and the vertical right prediction method that results in a minimum number of output bits. The optimal prediction method that results in a minimum number of output bits and the $P_e$ for each of the first block, the second block, the third block, and the fourth block are stored. The stored $P_e$ is a JPEG encoded $P_e$. The prediction method is a color intra-block prediction method.

In yet another aspect, a system for optimizing a prediction method of samples in blocks of an image is provided. The image includes a first block, a second block, a third block, and a fourth block. The prediction method includes at least one of a DC prediction method, a horizontal prediction method, a vertical prediction method, a vertical left prediction method, and a vertical right prediction method. The system includes means for performing a prediction of the second block, means for performing a prediction of the third block, means for performing a prediction of the fourth block, means for computing a prediction error per block ($P_e$) for each of the prediction methods that are performed to predict the second block, the third block, the fourth block, means for choosing an optimal prediction method from each of the prediction methods performed, means for storing the optimal prediction method, and means for storing the prediction error per block ($P_e$) for the blocks. The prediction error per block ($P_e$) equals an original block value minus a predicted block value.

The prediction of the second block from the first block is performed by any of a DC prediction method and a horizontal prediction method. The prediction of the third block from the first block and the second block is performed by any of the DC prediction method, and any of the vertical prediction method, and the vertical left prediction method. The prediction of the fourth block from the first block, the second block, and the third block is performed by any of the DC prediction method, and the horizontal prediction method or, the vertical prediction method and, any of a vertical left prediction method, and a vertical right prediction method.

The system further includes a means for computing a summation of the prediction error for all pixels per block for each of the DC prediction method, the horizontal prediction method, the vertical prediction method, the vertical left prediction method, and the vertical right prediction. The summation equals $\Sigma|P_e|$ (summation on pixels per block). An optimal prediction method is chosen from the DC prediction method, the horizontal prediction method, the vertical prediction method, the vertical left prediction method, and the vertical right prediction method based on the summation that result in a minimum $\Sigma|P_e|$ (summation on pixels per block).

The system may further include means for performing a Discrete Cosine Transformation, a Zigzag scan, and a Huffman Coding on each of the prediction error per block ($P_e$). The optimal prediction method is chosen from the DC prediction method, the horizontal prediction method, the vertical prediction method, the vertical left prediction method, and the vertical right prediction method based on each of the prediction error per block ($P_e$) that results in a minimum number of output bits. The stored $P_e$ is a JPEG encoded $P_e$. The prediction method is at least one of a luminance intra-block prediction method, or a color intra-block prediction method.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for an improved technique for prediction based image compression with improved compression efficiency. The embodiments herein achieve this by providing a technique for optimizing a prediction method of samples in blocks of an image that may enable choosing an optimum prediction method that results in the minimum summation of a difference between an original block and a predicted block for all the pixels per block. Further the method may enable choosing an optimum prediction method that gives the minimum number of encoded bits at the output on passing each prediction method through DCT, Zigzag, and Huffman coding operations. Referring now to the drawings, and more particularly to FIGS. 3A through 8, where similar reference characters denote corresponding features consistently throughout the figures, there are shown preferred embodiments.

Figure 3A:
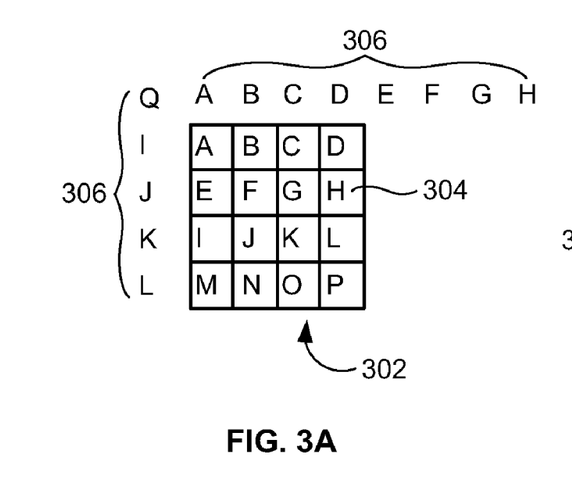
FIG. 3A illustrates a 4×4 block predicted from spatially neighboring samples according to an embodiment herein.

FIG. 3A illustrates a 4×4 block 302 predicted from spatially neighboring samples according to an embodiment herein. The block 302 includes samples (16 samples) which are labeled as A-P as shown in FIG. 3A. The sixteen samples are predicted using prior decoded samples in adjacent blocks which are labeled as A-Q.

Figure 3B:
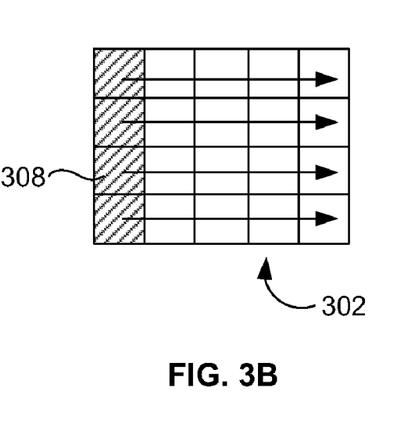
FIGS. 3B through 3E illustrate various spatial prediction methods according to an embodiment herein.
Figure 3C:
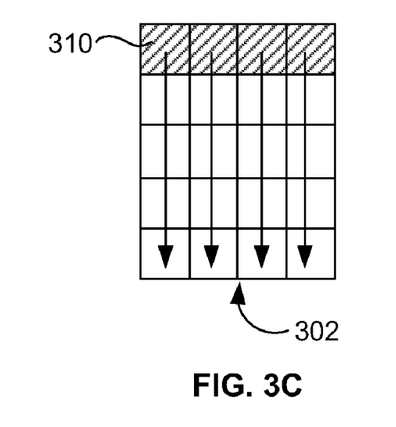
Figure 3D:
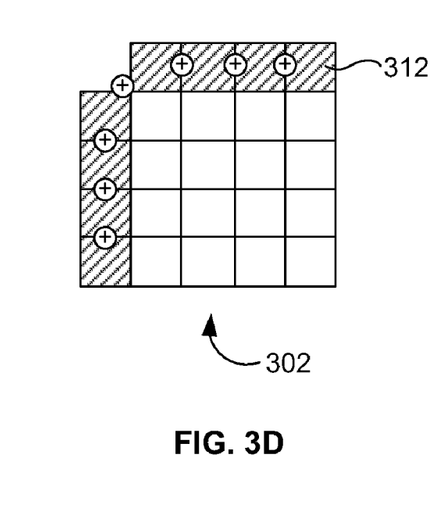
Figure 3E:
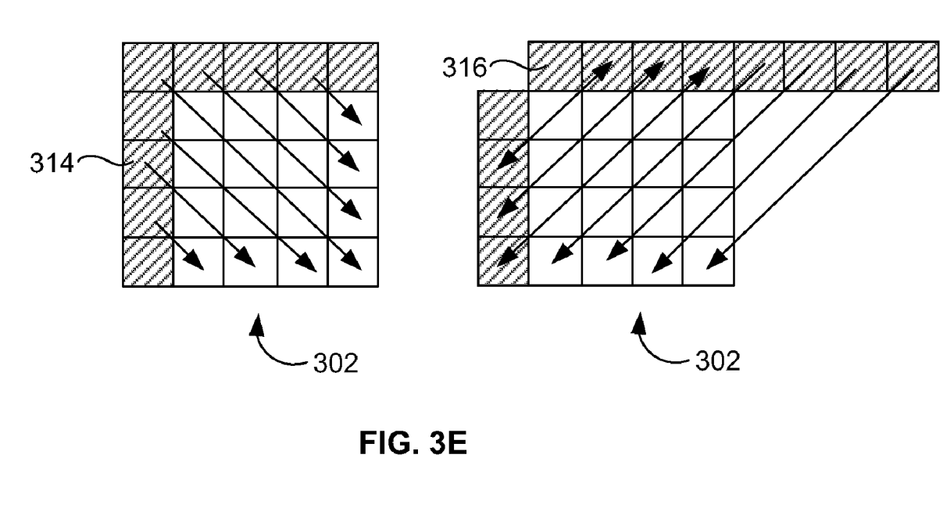

With reference to FIG. 3A, FIGS. 3B through 3E illustrates various spatial prediction methods that can be used for intra blocks according to an embodiment herein. FIG. 3B includes the samples 308 that are above the 4×4 block 302 for performing a vertical prediction. For performing a horizontal prediction, the samples 310 to the left of the 4×4 block are copied as shown in FIG. 3C. For performing a DC prediction, the adjacent samples 312 are averaged as shown in FIG. 3D. For Diagonal prediction, diagonal-down-left samples 314 and diagonal-down-right samples 316 are considered which are shown in FIG. 3D and FIG. 3E, respectively. In one embodiment, the diagonal prediction may be performed by taking vertical-right, horizontal-down, vertical-left samples, or horizontal-up predictions. These predictions are used to predict textures with structures in specified directions.

Figure 4A:
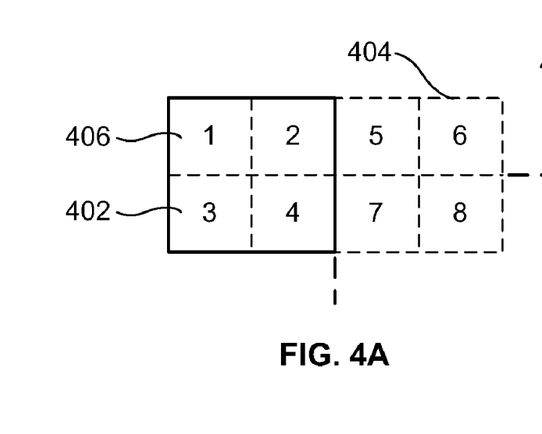
FIG. 4A illustrates two Macro-blocks, a first Macro-block and a second Macro-block, each formed of four (8×8) blocks according to an embodiment herein.
Figure 4B:
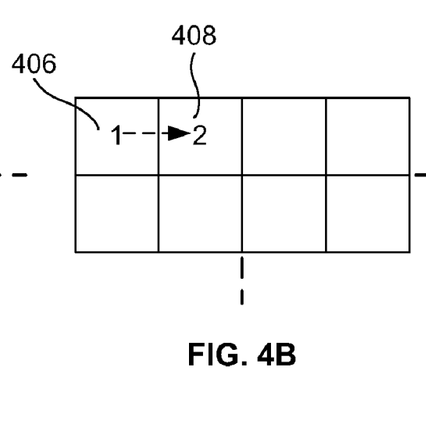
FIGS. 4B through 4E illustrate various spatial prediction methods that can be used for intra block luma prediction for a second block, a third block, a fourth block, and a fifth block according to an embodiment herein.
Figure 4C:
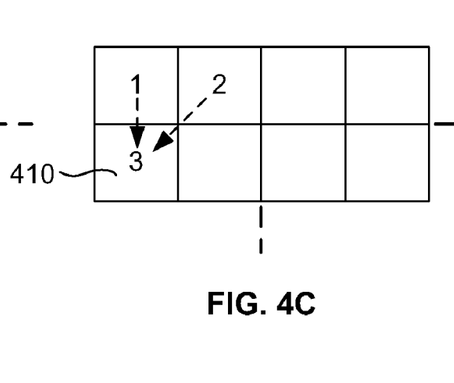
Figure 4D:
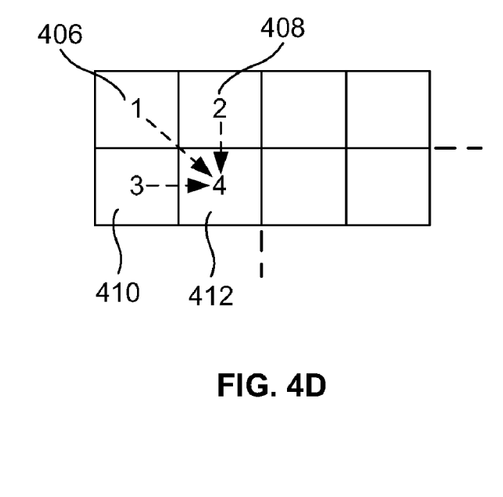

FIG. 4A illustrates two Macro-blocks, a first Macro-block 402 and a second Macro-block 404 each formed of four (8×8) blocks according to an embodiment herein. The first Macro-block includes a first block 406. With reference to FIG. 4A, FIGS. 4B through 4E illustrate various spatial prediction methods that can be used for intra block luma prediction for a second block 408, a third block 410, a fourth block 412, and a fifth block 414 according to an embodiment herein. The second block 408 is predicted from the first block 406 by performing a DC prediction method, or a horizontal prediction method as shown in FIG. 3B.

Figure 4E:
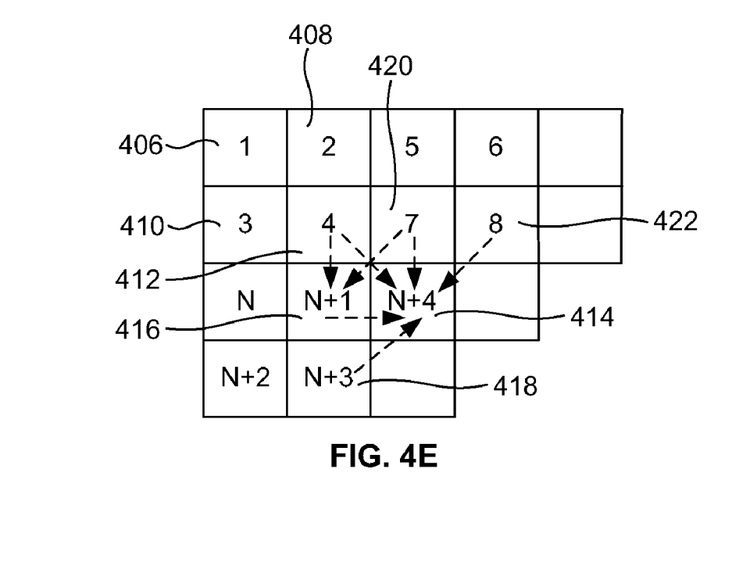

The third block 410 is predicted from the first block 406, and the second block 408 by performing a DC prediction method, and at least one of a vertical prediction method, and a vertical left prediction method as shown in FIG. 3C. The fourth block 412 is predicted from the first block 406, the second block 408, and the third block 410 by performing the DC prediction method, the horizontal prediction method, and at least one of the vertical prediction method, and a vertical right prediction method as shown in FIG. 3D. The fifth block (N+4 block) is predicted based on the fourth block 412, a number 7 block 420, a number 8 block 422, a (N+1) block 416 and a (N+3) block 418. Similarly, the (N+1) block is predicted based on the fourth block 412, a number 7 block 420 as shown in FIG. 4E.

Figure 5:
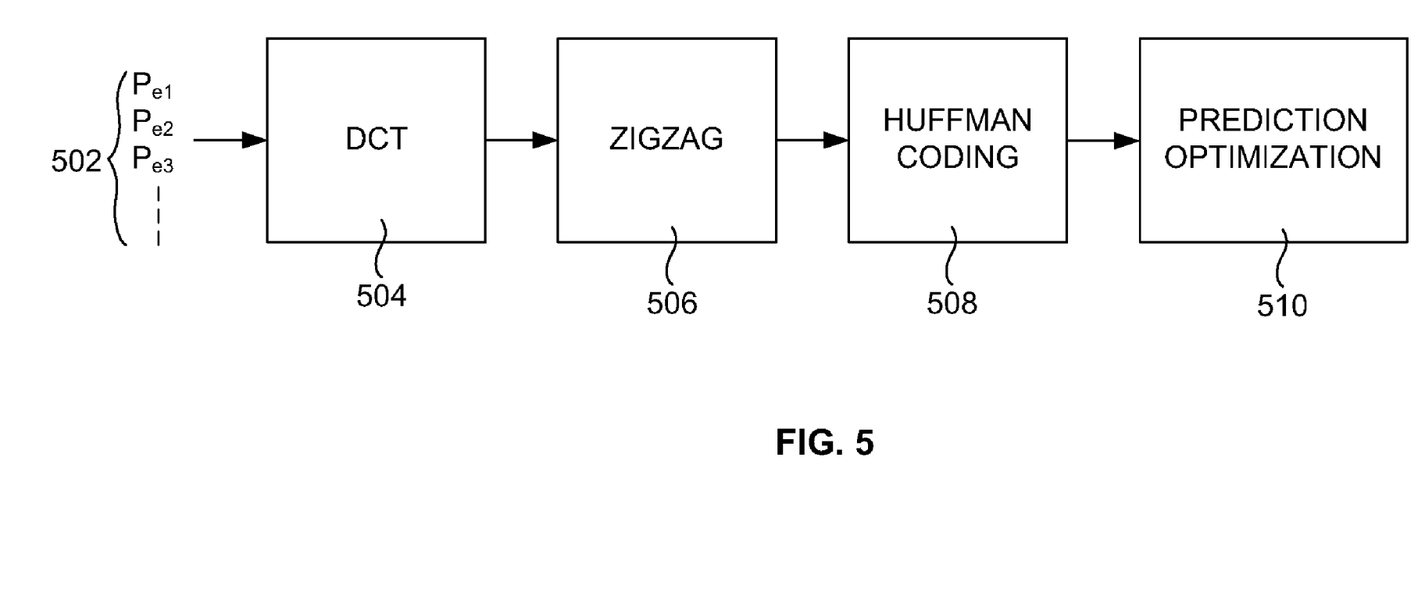
FIG. 5 is a block diagram illustrating a second criteria used to choose a most suitable prediction method according to an embodiment herein.

FIG. 5 is a block diagram illustrating a second criteria used to choose a most suitable prediction method according to an embodiment herein. A prediction error per block (Pe) for each prediction method as shown in FIG. 3B through 3E is computed by performing a prediction of the second block 408, the third block 410, and the fourth block 412. The prediction error per block is computed using the following equation: $P_e$=Original block−Predicted block.

An optimal prediction method 510 is chosen by passing the $P_e$ for each of the DC prediction method, the horizontal prediction method, the vertical prediction method, the vertical left prediction method, and the vertical right prediction method through a Discrete Cosine Transformation operation 504, a Zigzag scan operation 506, and a Huffman Coding operation 508. The output of the performed prediction methods that results in a minimum number of output bits is chosen as the optimum prediction method 510. The optimal prediction method 510 and the JPEG encoded $P_e$ for each block (output of the performed prediction methods that results in a minimum number of output bits for each block) is stored.

Figure 6A:
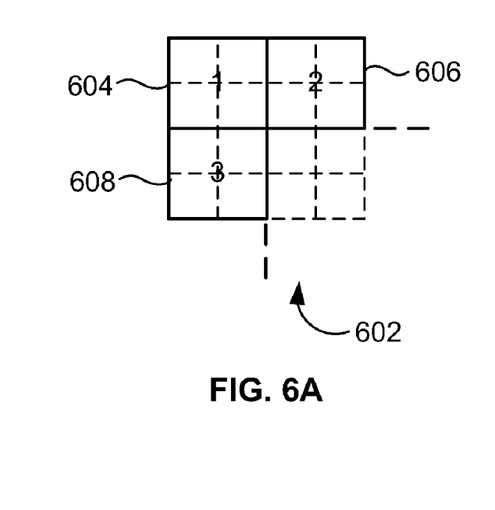
FIG. 6A illustrates a Chroma-block formed of four (8×8) blocks according to an embodiment herein.
Figure 6B:
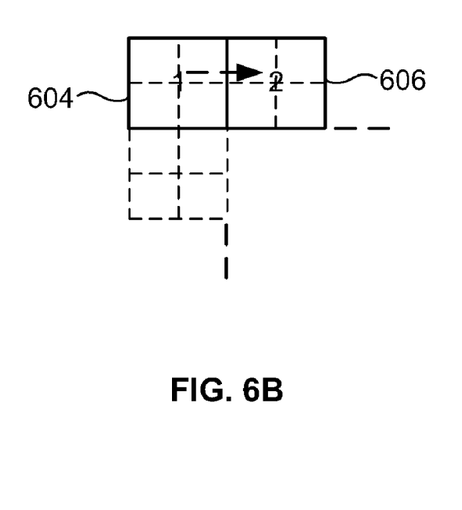
FIGS. 6B and 6C illustrate various spatial prediction methods that can be used for intra block luma prediction for a second block and a third block according to an embodiment herein.
Figure 6C:
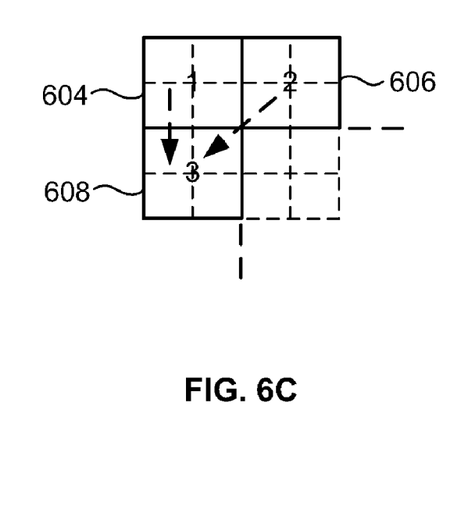

FIG. 6A illustrates a Chroma-block 602 formed of four (8×8) blocks according to an embodiment herein. The Chroma-block 602 includes a first block 604. With reference to FIG. 6A, FIGS. 6B and 6C illustrate various spatial prediction methods that can be used for intra block Luma prediction for a second block 606 and a third block 608 according to an embodiment herein. The second block 606 is predicted from the first block 604 by performing a DC prediction method, or a horizontal prediction method as shown in FIG. 6B.

The third block 410 is predicted from the first block 604, and the second block 605 by performing the DC prediction method, and at least one of a vertical prediction method, or a vertical left prediction method as shown in FIG. 6C. A fourth block (not shown) may be predicted from the first block, the second block, and the third block by performing the DC prediction method, the horizontal prediction method, and at least one of the vertical prediction method, or a vertical right prediction method. Similarly a prediction error per block ($P_e$) for each prediction method as shown in FIG. 3B through 3E is computed by performing predictions of the second block 606, the third block 606. The prediction error per block is computed using the following equation: $P_e$=Original block−Predicted block.

Similarly, for the Chroma block, an optimal prediction method is chosen by passing the $P_e$ for each of the DC prediction method, the horizontal prediction method, the vertical prediction method, the vertical left prediction method through a Discrete Cosine Transformation operation 504, a Zigzag scan operation 506, and a Huffman Coding operation 508. The output of the performed prediction methods that results in a minimum number of output bits is chosen as the optimum prediction method 510. The optimal prediction method 510 and the JPEG encoded $P_e$ for each block (output of the performed prediction methods that results in a minimum number of output bits for each block) is stored.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can comprise hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 7:
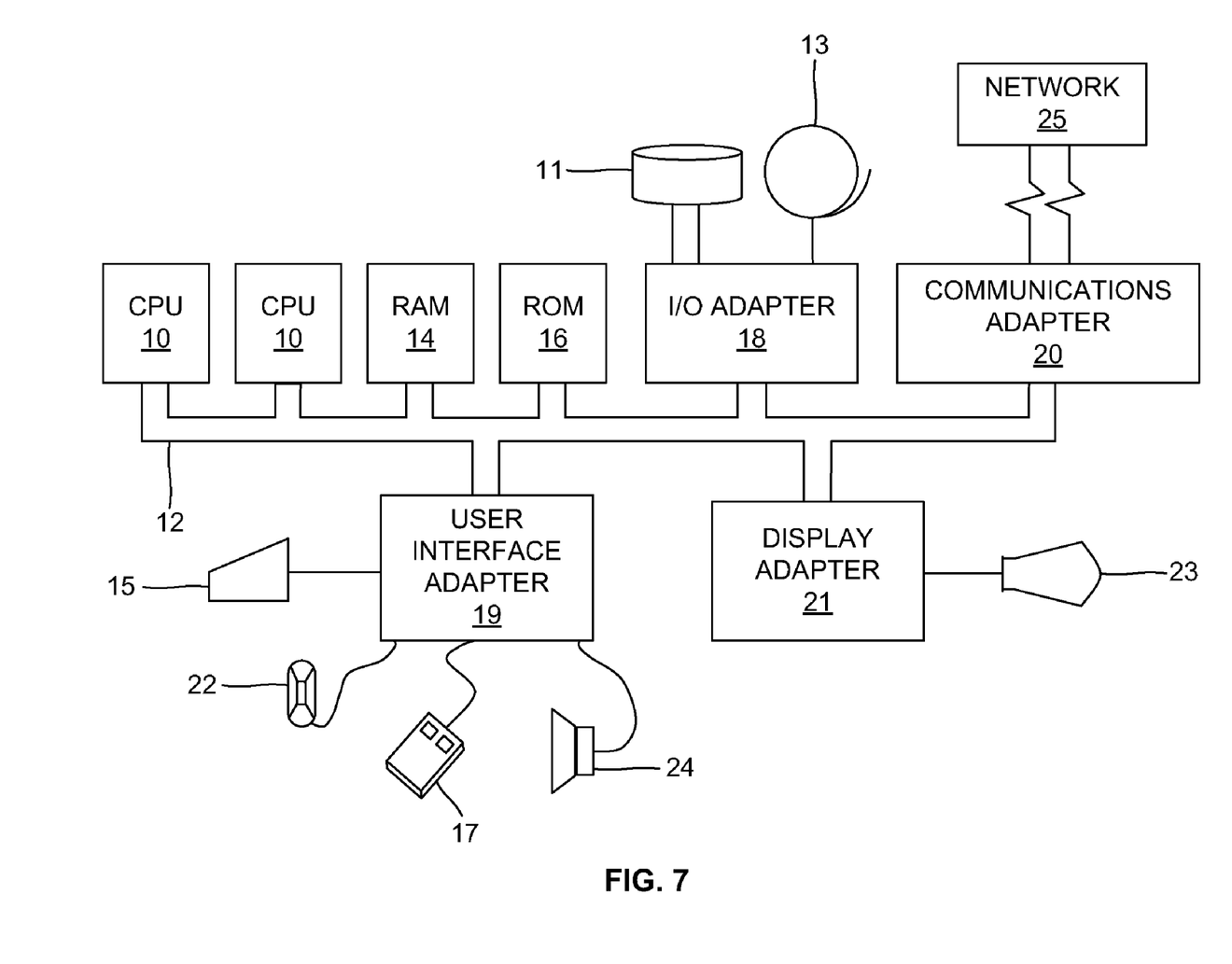
FIG. 7 illustrates a schematic diagram of a computer architecture used in accordance with the embodiments herein.

A representative hardware environment for practicing the embodiments herein is depicted in FIG. 7. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein.

The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

Figure 8:
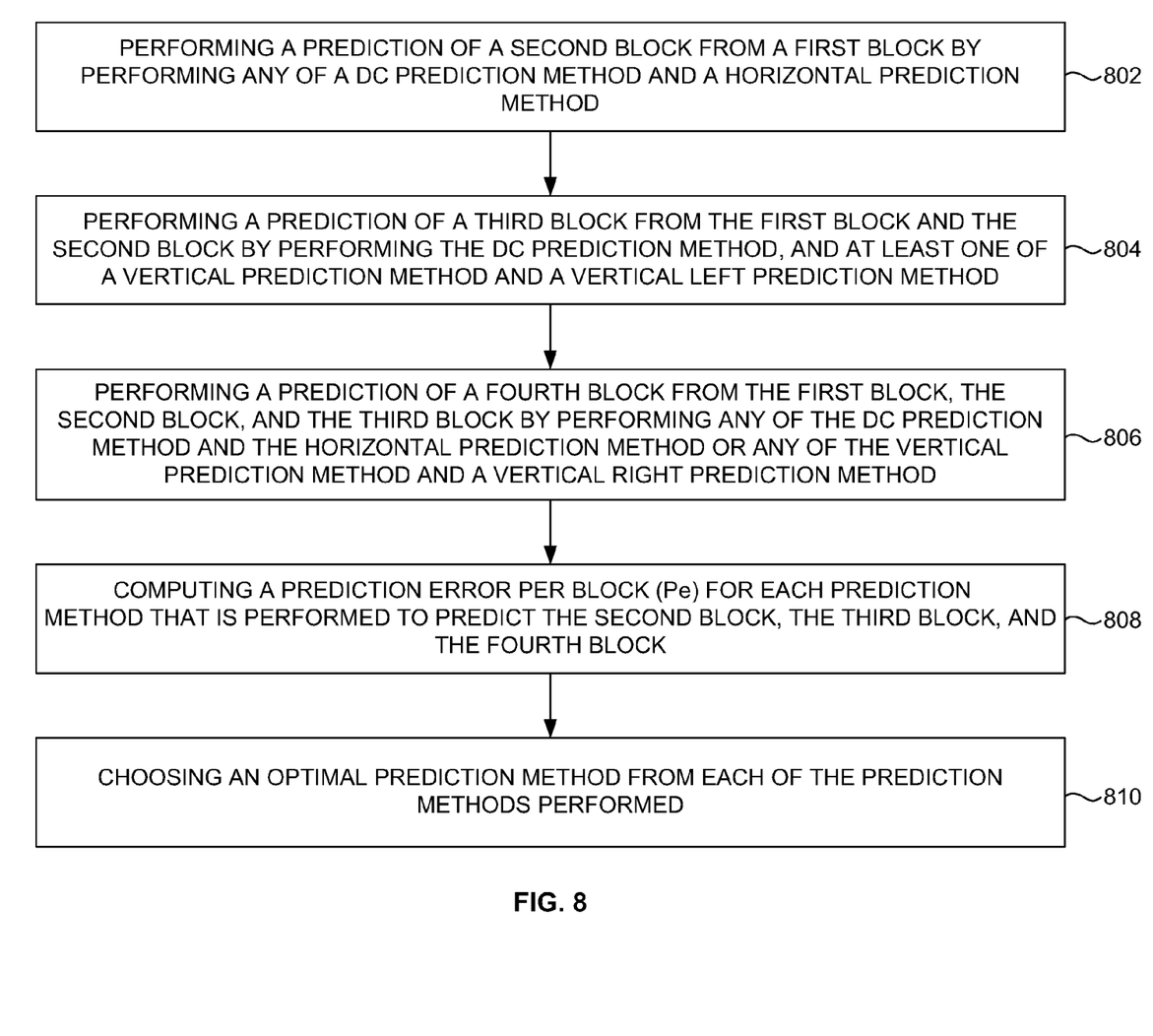
FIG. 8 is a flow diagram illustrating a method of optimizing a prediction method of samples in blocks of an image according to an embodiment herein.

FIG. 8 with reference to FIGS. 3 through 7, is a flow diagram illustrating a method of optimizing a prediction method of samples in blocks of an image according to an embodiment herein. The image includes a first block, a second block, a third block, and a fourth block. In step 802, a prediction of the second block is performed from the first block by performing any of a DC prediction method and a horizontal prediction method. In step 804, a prediction of the third block is performed from the first block and the second block by performing the DC prediction method, and at least one of a vertical prediction method and a vertical left prediction method.

In step 806, a prediction of the fourth block is performed from the first block, the second block, and the third block by performing any of the DC prediction method and the horizontal prediction method or any of the vertical prediction method and a vertical right prediction method. In step 808, a prediction error per block ($P_e$) is computed for each of the prediction method that is performed to predict the second block, the third block, and the fourth block. The prediction error per block ($P_e$) equals an original block value minus a predicted block value. In step 810, an optimal prediction method from each of the prediction methods performed. The performed prediction methods may be any of the DC prediction method, the horizontal prediction method, and at least one of the vertical prediction method, the vertical left prediction method, and a vertical right prediction method.

In one embodiment, the optimal prediction method is chosen by computing a summation of the prediction error per block for each of the DC prediction, the horizontal prediction method, the vertical prediction method, the vertical left prediction method, and the vertical right prediction method, and choosing the optimal prediction method from the DC prediction method, the horizontal prediction method, the vertical prediction method, the vertical left prediction method, and the vertical right prediction method based on the summation that results in a minimum $\Sigma |P_e|$ pixels per block (summation on pixels per block).

In another embodiment, the optimal prediction method may be chosen by passing the $P_e$ for each of the DC prediction method, the horizontal prediction method, the vertical prediction method, the vertical left prediction method, and the vertical right prediction method through a Discrete Cosine Transformation, a Zigzag scan, and a Huffman Coding, and choosing the optimal prediction method from the DC prediction method, the horizontal prediction method, the vertical prediction method, the vertical left prediction method, and the vertical right prediction method that results in a minimum number of output bits.

The optimal prediction method that results in a minimum number of output bits and the Pe for each of the first block, the second block and the fourth block are stored. The $P_e$ stored is a JPEG encoded $P_e$. A fifth block prediction may be performed based on a first diagonal block, a second diagonal block, a third diagonal block, a first vertical block, and a horizontal block. The prediction method is at least one of a luminance intra-block prediction method or a color intra-block prediction method. In one embodiment, the first block, the second block, the third block, and the fourth block include 8×8 blocks and each of the 8×8 blocks form on Macro block for performing the luminance intra-block prediction. In another embodiment, the first block, the second block, and the third block include 16×16 blocks and each of the 16×16 blocks form one Luma Macro block. Each of the Luma macro block corresponds to an 8×8 color block for performing the color intra-block prediction method.

The method of optimizing a prediction method of samples in blocks of an image may enable choosing an optimum prediction method that results in the minimum summation of a difference between an original block and a predicted block for all the pixels per block. Further, the method may enable choosing an optimum prediction method that gives the minimum number of encoded bits at the output on passing each prediction method through DCT, Zigzag, and Huffman coding operations. Thus, the method provides a prediction based image compression engine with improved compression efficiency. The embodiments herein may be used in an analog television application.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method of optimizing a prediction method of samples in blocks of an image, said image comprising a first block, a second block, a third block, and a fourth block, wherein said first block, said second block, said third block, and said fourth block comprise 8×8 blocks, wherein each of said 8×8 blocks form one Macro block, said method comprising:

performing a prediction of said second block from said first block by performing any of a DC prediction method and a horizontal prediction method;

performing a prediction of said third block from said first block and said second block by performing said DC prediction method, and at least one of a vertical prediction method and a vertical left prediction method;

performing a prediction of said fourth block from said first block, said second block, and said third block by performing any of said DC prediction method and said horizontal prediction method or any of said vertical prediction method and a vertical right prediction method;

computing a prediction error per block ($P_e$) using a computer processor for each prediction method that is performed to predict said second block, said third block, and said fourth block, wherein said prediction error per block ($P_e$) equals an original block value minus a predicted block value;

choosing an optimal prediction method from each of the prediction methods performed, wherein said performed prediction methods comprise said DC prediction method, said horizontal prediction method, and at least one of said vertical prediction method, said vertical left prediction method, and a vertical right prediction method; and storing said optimal prediction method on a memory device.

2. The method of claim 1, wherein said choosing said optimal prediction method comprises:

computing a summation of said prediction error per block for each said DC prediction, said horizontal prediction method, said vertical prediction method, said vertical left prediction method, and said vertical right prediction method, wherein said summation equals $\Sigma |P_e|$ (summation on pixels per block); and choosing said optimal prediction method from said DC prediction method, said horizontal prediction method, said vertical prediction method, said vertical left prediction method, and said vertical right prediction method based on said summation that results in a minimum $\Sigma |P_e|$ (summation on pixels per block).

3. The method of claim 1, wherein said choosing said optimal prediction method comprises:

passing said $P_e$ for each said DC prediction method, said horizontal prediction method, said vertical prediction method, said vertical left prediction method, and said vertical right prediction method through a Discrete Cosine Transformation, a Zigzag scan, and a Huffman Coding; and choosing said optimal prediction method from said DC prediction method, said horizontal prediction method, said vertical prediction method, said vertical left prediction method, and said vertical right prediction method that results in a minimum number of output bits.

4. The method of claim 1, further comprising storing said optimal prediction method that results in a minimum number of output bits.

5. The method of claim 1, further comprising storing said $P_e$ for each of said first block, said second block, said third block, and said fourth block, wherein said $P_e$ stored comprises a JPEG encoded $P_e$.

6. The method of claim 1, further comprising performing a prediction of a fifth block based on a first diagonal block, a second diagonal block, a third diagonal block, a first vertical block, and a horizontal block.

7. The method of claim 1, wherein said prediction method comprises a luminance intra-block prediction method.

8. A method of optimizing a prediction method of samples in blocks of an image, said image comprising a first block, a second block, and a third block, wherein said first block, said second block, and said third block comprise 16×16 blocks, wherein each of said 16×16 blocks form one Luma Macro block, each of said Luma macro block corresponding to an 8×8 color block, said method comprising:

performing a prediction of said second block from said first block by performing any of a DC prediction method and a horizontal prediction method;

performing a prediction of said third block from said first block, said second block, and said third block by performing any of a DC prediction method and any of a vertical prediction method and a vertical left prediction method;

performing a prediction of a fourth block from said first block, said second block, and said third block by performing any of said DC prediction method and said horizontal prediction method or any of said vertical prediction method and a vertical right prediction method;

computing a prediction error per block ($P_e$) using a computer processor for each prediction method that is performed to predict said second block, said third block, said fourth block, wherein said prediction error per block ($P_e$) equals an original block value minus a predicted block value;

choosing an optimal prediction method from said DC prediction method, said horizontal prediction method, said vertical prediction method, said vertical left prediction method, and said vertical right prediction method; and storing said optimal prediction method on a memory device.

9. The method of claim 8, wherein said choosing said optimal prediction method comprises:

computing a summation of said prediction error for all pixels per block for each said DC prediction method, said horizontal predication method, said vertical prediction method, said vertical left prediction method, and said vertical right prediction method, wherein said summation equals $\Sigma |P_e|$; and choosing said optimal prediction method from each of the prediction methods performed, wherein said performed prediction methods comprise said DC prediction method, said horizontal prediction method, and at least one of said vertical prediction method, said vertical left prediction method, and a vertical right prediction method.

10. The method of claim 9, wherein said choosing said optimal prediction method comprises:

passing said $P_e$ for each said DC prediction method, said horizontal prediction method, said vertical prediction method, said vertical left prediction method, and said vertical right prediction method through a Discrete Cosine Transformation, a Zigzag scan, and a Huffman Coding; and choosing said optimal prediction method from said DC prediction method, said horizontal prediction method, said vertical prediction method, said vertical left prediction method, and said vertical right prediction method that results in a minimum number of output bits.

11. The method of claim 9, further comprising storing said optimal prediction method that results in a minimum number of output bits.

12. The method of claim 9, further comprising storing said $P_e$ for each of said first block, said second block, said third block, and said fourth block, wherein said $P_e$ stored comprises a JPEG encoded $P_e$.

13. The method of claim 12, wherein said prediction method comprises a color intra-block prediction method.

14. A system optimizing a prediction method of samples in blocks of an image, said image comprising a first block, a second block, a third block, and a fourth block, wherein said prediction method comprises at least one of a DC prediction method, a horizontal prediction method, a vertical prediction method, a vertical left prediction method, and a vertical right prediction method, said system comprising:

means for performing a prediction of said second block;

means for performing a prediction of said third block;

means for performing a prediction of said fourth block;

means for computing a prediction error per block ($P_e$) for each of said prediction methods that are performed to predict said second block, said third block, said fourth block, wherein said prediction error per block ($P_e$) equals an original block value minus a predicted block value;

means for choosing an optimal prediction method from each of the prediction methods performed;

means for storing said an optimal prediction method; and means for storing said prediction error per block ($P_e$) for said blocks, wherein said prediction of said second block from said first block is performed by any of a DC prediction method and a horizontal prediction method, wherein said prediction of said third block from said first block and said second block is performed by any of said DC prediction method and any of said vertical prediction method and said vertical left prediction method, and wherein prediction of said fourth block from said first block, said second block, and said third block is performed by any of said DC prediction method and said horizontal prediction method or said vertical prediction method and any of a vertical left prediction method and a vertical right prediction method.

15. The system of claim 14, further comprising means for computing a summation of said prediction error for all pixels per block for each said DC prediction method, said horizontal prediction method, said vertical prediction method, said vertical left prediction method, and said vertical right prediction method, wherein said summation equals $\Sigma|P_e|$ (summation on pixels per block).

16. The system of claim 15, wherein an optimal prediction method is chosen from said DC prediction method, said horizontal prediction method, said vertical prediction method, said vertical left prediction method, and said vertical right prediction method based on said summation that result in a minimum $\Sigma|P_e|$ (summation on pixels per block).

17. The system of claim 14, further comprising means for performing a Discrete Cosine Transformation, a Zigzag scan, and a Huffman Coding on each of said prediction error per block ($P_e$).

18. The system of claim 17, wherein said optimal prediction method is chosen from said DC prediction method, said horizontal prediction method, said vertical prediction method, said vertical left prediction method, and said vertical right prediction method based on each of said prediction error per block ($P_e$) that results in a minimum number of output bits.

19. The system of claim 14, wherein said $P_e$ stored comprises a JPEG encoded $P_e$.

20. The system of claim 14, wherein said prediction method comprises at least one of a luminance intra-block prediction method, or a color intra-block prediction method.

* * * * *